Patented Sept. 24, 1929

1,728,977

UNITED STATES PATENT OFFICE

ANTON G. E. NORDQUIST, OF DENVER, COLORADO

AUTOMATIC TIRE PUMP

Application filed March 10, 1928. Serial No. 260,763.

My invention relates to tire pumps, and more especially to tire pumps which are designed to be mounted upon a wheel having a pneumatic tire, the revolution of the wheel acting to operate the pump and force air into the tire.

The object of my invention is to provide a simple, cheap, and easily installed tire pump which may be mounted directly upon the wheel of a vehicle, and which will be operated by the revolution of the wheel.

A further object is to provide such a pump which may be disconnected from the tire easily when a change of tires is made, and without dismounting the pump from the wheel.

A further object is to provide such a tire pump so constructed that it will stop pumping automatically when the desired tire pressure is reached.

A further object is to provide such a pump which will automatically begin to pump when the tire pressure falls below the desired pressure, which may be predetermined.

A further object is to provide such a tire pump in which the desired pressure may easily be set to any figure desired within the range of ordinary tire pressures.

A further object is to provide such a pump in which there is an adjustment for wear of the parts so that even after long use the pump may be properly adjusted to give satisfactory service.

A further object is to provide such a pump in which the parts most likely to be harmed by water, mud, grit, and dirt, may be completely enclosed.

My pump is fully described in the specifications below and is illustrated in the drawings, in which;—

Figure 4 is a fragmentary section on the line 4—4 of Figure 2.

Figure 1:
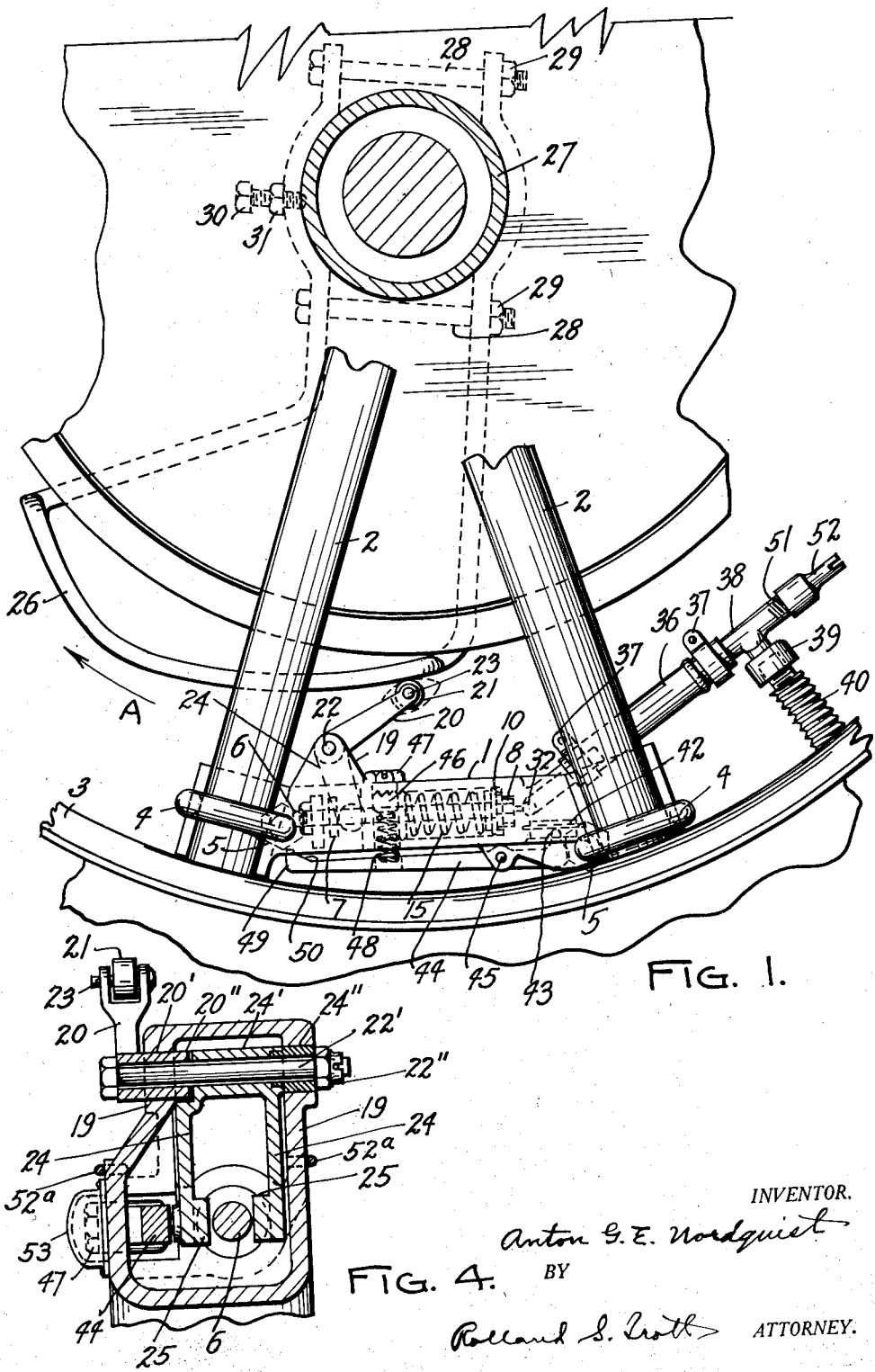
Figure 1 is a fragmentary view, in partial section, of my pump as installed on a wheel with ordinary wood spokes, but a fragment of the wheel, brake drum, and axle flange brake drum enclosure being shown.

In Figure 1 it will be seen that the pump body 1 is clamped to the spokes 2 of the wheel adjacent the felloe 3, by means of the hooks 4, held by the nuts 5. Any other proper method of mounting the pump in place on the wheel may be used so long as it results in a solid and reliable mounting.

Figure 3:
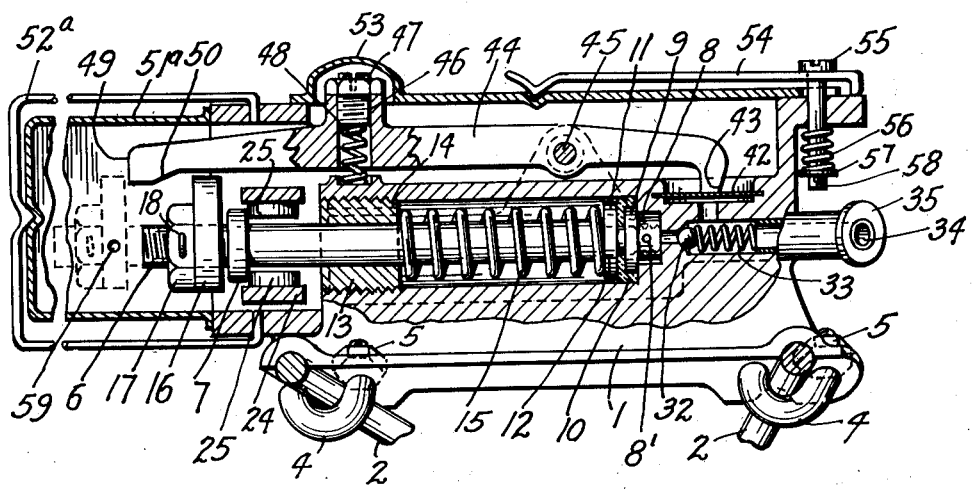
Figure 3 is a fragmentary section on the line 3—3 of Figure 2.

In Figure 3 it will be seen that the plunger 6, which is provided with the integral shoulder 7, has threaded upon its inner end the nut 8, which holds the washer 9, the cup leather 10, and the washer 11 against the shoulder 12. The nut 8 is locked in place by the pin 8'.

This entire plunger assembly moves as a unit, as will appear below.

The bushing 13, provided with the air hole 14, is threaded into the bore of the body 1, the spring 15 bearing against the bushing 13 and against the washer 11. The bushing 13 acts as a guide for the movement of the plunger 6 in the bore of the body 1.

Thus, when the plunger is withdrawn from the inner end of the bore of the body 1, the spring 15 will act to resiliently force it again into the bore till the nut 8 contacts with the end thereof, which is provided with a smaller bore, little larger than the nut 8.

Thus very little clearance is left between the plunger and the end of the bore, which adds to the efficiency of the pump.

The outer end of the plunger 6 is threaded and upon it are threaded the trigger lock 16 and the lock nut 17, which last is locked in place by the cotter pin 18.

In Figure 1 the body 1 is provided with the bellcrank supports 19, which mount the bellcrank 20 by the pivot pin 22.

The bellcrank 20 is provided with the contact piece or roller 21, mounted in its yoked end by the pivot pin 23.

The bellcrank 20 is provided with the forked ends 24, which have inwardly extending lugs 25, adapted to bear against the shoulder 7 of the plunger 6.

The cam 26 is clamped upon the axle housing 27 by the bolts and nuts 28 and 29, and locked from turning thereon by the set screw 30 and the lock nut 31.

As the wheel is revolved in the direction shown by the arrow A, the roller 21 of the bellcrank 20 contacts with the cam 26 and is thereby revolved about its pivot 22. This, through the lugs 25 and the shoulder 7 forces the plunger 6 back against the pressure of the spring 15 as shown in Figure 3, and when the roller 21 passes over the high point of the cam 26 the spring 15 forces the plunger 6 back to the inner end of the bore of the body 1.

This reciprocating movement of the plunger 6 in the bore of the body 1, allows air to pass the cup 10 on the outstroke, and forces this air, on the instroke through the ball check valve 32, which is normally held in place by the spring 33, which in turn is held in place in the stem 35 by the bushing 34.

The tube 36, of any proper material, is mounted on the stem 35 by the fitting 37, or in any other proper manner. The other end of the tube 36 is likewise properly mounted upon the fitting 38, the member 39 of which is adapted to thread upon the tire valve stem 40, the joint being made tight by the gasket 41 (see Figure 2) or in any other proper manner.

Connected with the passage or reservoir in the stem 35 is the diaphragm 42, made of any proper material and construction and mounted in any proper manner which provides an air tight joint.

Against the center of the diaphragm 42 rests the diaphragm end 43, of the trigger 44, which is pivotally mounted on the body 1 by the pivot pin 45.

The trigger 44 is provided with the air adjusting screw 46, adjusting nut 47, and air adjusting spring 48, and with the catch end 49.

The diaphragm 42 may be made of any proper material and construction and thickness just so that it will act to occupy different positions for different air pressures in the passage of the stem 35. Thus the end 43 will also have a different position for each different air pressure in the stem 35.

As the air pressure in the stem 35 increases, the diaphragm 42 will be forced outward which will force the diaphragm end 43 of the trigger 44 outward, and due to the pivot pin 45, this will force the catch end 49 inward.

If the pump is in operation and the wheel revolving, the trigger catch end 49 will reach a point in the pivotal movement of the trigger 44, due to the movement of the diaphragm 42, where it will contact with the trigger lock 16 of the plunger 6 on its outward stroke, the bevel 50 of the trigger 44 acting to momentarily force the catch end 49 outward against the pressure of the spring 48, and the diaphragm 42 inward against the pressure of the air in the stem 35, sufficient to let the lock 16 pass the catch 49.

The catch 49 will then snap in under the lock 16 and hold the lock 16 and the entire plunger 6 in that position, and the operation of the pump will then cease.

The roller 21 of the bellcrank 20 will merely touch the high point of the cam 26 at each revolution of the wheel. Either the cam 26 or the roller 21 or both of them, may, if desired be made of some long-wearing sound deadening material that will make nearly noiseless the contact between them.

Should air leak out of the tire, the pressure in the stem 35 will decrease also. That is, if the tire valve in the stem 40 has been removed, the pressure in the tire and in the stem 35 will always be the same. If the tire valve is retained in the stem 40, which I prefer, the air pressure in the stem 35 will drop as soon as the pressure in the tire has fallen enough to permit the air in the stem 35 and in the tube 36 to force open the tire valve in the stem 40 and equalize the pressures in the tire and in the stem 35.

In either case, drop of air pressure in the stem 35 will allow the spring 48 to move the end 43 and the diaphragm 42 inward slightly against the decreased pressure.

This will move the catch end 49 outwardly, release the lock 16 and start the operation of the pump.

The tire valve stem 51, provided with an ordinary air valve, is an extension of the fitting 38. The stem 51 is provided with the cap 52. This is for the purpose of inflating the tire when my pump is originally installed, and for the purpose of setting the tire pump to pump the desired pressure, by use of an air gauge, as will appear below.

When it is desired to increase the pressure at which the trigger 44 will cut out the action of the pump, the screw 46 is screwed inward, which puts greater pressure on the diaphragm 42, and hence requires greater pressure in the stem 35 before the catch 49 will snap in under the lock 16.

When it is required to carry a lower pressure in the tire the screw 46 is screwed outward, putting less pressure against the diaphragm 42, and allowing a lower pressure to operate the catch 49 and snap in under the lock 16. In either case the usual tire gauge may be used on the stem 51 to check the pressure, the cap 52 being first removed.

When the pressure in the tire and the stem 35 decreases the pressure against the diaphragm 42 decreases, allowing the spring 48 to force the catch end 49 of the trigger 44, out from under the lock 16. This will happen probably just as the roller 21 contacts with the high point of the cam 26, and momentarily lifts the lock 16 from bearing against the catch end 49.

The pumping will then continue as before, putting air into the stem 35 and into the tire at every stroke till the pressure working against the diaphragm 42 is again sufficient to cause the catch 49 to snap in under the lock 16 against the pressure of the spring 48.

The position of the lock 16 on the plunger 6 may be adjusted as desired and locked in place by the nut 17 and the cotter pin 18.

It is best to have the lock 16 adjusted so that it will barely allow the catch end 49 to snap in under it when the roller 21 is at the very top of the cam 26. This will tend to permit very little contact between the cam and the roller when the pump is not pumping, and hence there will be little chance for noise.

But, as the parts wear, especially the cam, roller, roller pivot pin 23 or bellcrank pivot pin 22, the stroke of the plunger will be slightly decreased, till it might not quite permit the catch end 49 to snap in under the lock 16. For these reasons the adjustment is provided.

Figure 2:
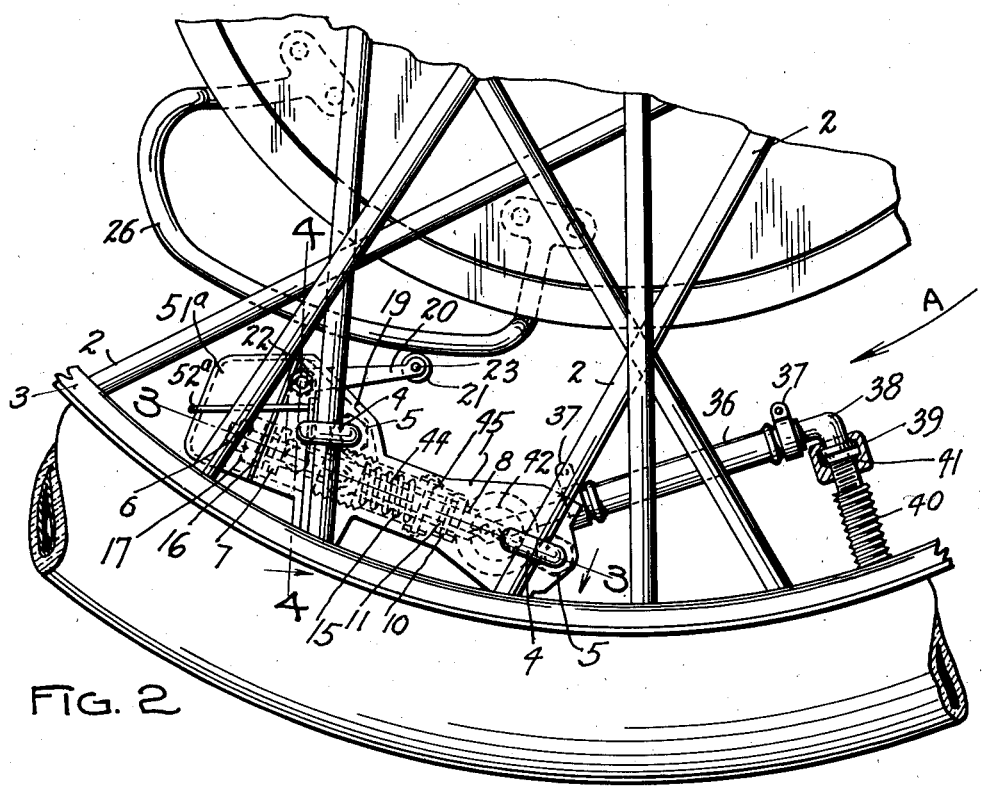
Figure 2 is a fragmentary view in partial section, of my pump as installed on a wheel with steel spokes, but a fragment of the wheel, brake drum, and brake drum enclosure being shown.

The construction shown in Figures 2, 3, and 4 is quite similar to that of Figure 1, except that these figures show a form adapted to be mounted upon wire spoked wheels, and they also show a form adapted to be used to completely cover all working parts of my pump except the roller arm of the bell crank.

In Figure 2, also, the cam 26 is indicated as being mounted on the axle flange brake drum enclosure.

In this construction the body 1 is extended to form a base for the mounting of the plunger cover 51$^a$, held in place by the pivoted snap holder 52$^a$.

The body 1 is also provided with extensions or walls surrounding the trigger 44 and the diaphragm 42 and providing a base for the mounting of the trigger cover 53, held in place by the snap 54, the pin 55, spring 56, washer 57 and pin 58.

The plunger cover 51$^a$ which is provided with the small air hole 59 (see Figure 3), may be easily removed for adjustment of the lock 16. And the trigger cover 53 may be easily removed for the adjustment of the trigger spring 48.

In Figure 4 the bellcrank arm 20 is provided with a hub 21′ having integral axially disposed keys 20″, which fit closely into recesses in the hub 24′ of the bellcrank arms 24, so that the two parts will be forced to rotate as one piece. The hub 20′ is journaled in the bellcrank support 19.

The thimble 24″ is journaled in the bellcrank support 19 and is centered by its reduced inner end in a counterbore of the bellcrank arm hub 24′.

The bellcrank arm 20, hub 24′, and thimble 24″ are all aligned and held together to act as one piece by the bolt 22 and the nut 22″.

Thus when both covers are in place the only exposed moving part of my pump is the arm 20. Any other proper method of mounting the bellcrank so that only the roller arm is exposed, may be employed if desired. The construction shown in Figure 1 is entirely exposed.

A nonrevolving contact piece of any proper material may be mounted on the pivot pin 23 in place of the roller, as indicated by the dotted lines in Figure 1, if desired.

Any other form or method of covering the working parts of my pump and protecting them from water, mud, grit and dirt, may be used provided the action of the pump and of the trigger mechanism is not interfered with.

It will now be seen that all objects sought have been attained.

The pump mounts directly upon the wheel of a vehicle, and is operated by the revolution of the wheel; removal of the fitting 39 from the tire valve stem permits the tire to be removed without the removal of the pump from the wheel; the pump automatically stops pumping when the desired pressure is reached; it will also automatically begin to pump when the tire pressure falls below the desired pressure which has been determined by the setting of the trigger spring tension; it will also automatically begin to pump when the tire pressure falls below the desired pressure; the desired pressure may be obtained easily by proper setting of the trigger spring; adjustment for wear and proper setting of the trigger lock may be easily made; and the moving parts of the pump are completely enclosed from harm by water, mud, grit, or dirt.

Having now described my invention, what I claim as new and desire to protect by Letters Patent, is as follows:—

1. In a tire pump, the combination of a body having a bore, a plunger for reciprocation in said bore, the body having a passage to receive the air pumped and communicating with said bore, a spring co-operating with said body and plunger to resiliently oppose withdrawal of the plunger from the body, a cam having a curved operating face and having relative movement with respect to the body, means pivotally mounted on the body and adapted to co-operate with the cam face and the plunger whereby the plunger will be moved against the pressure of the spring at each contact between the pivotally mounted means and the cam face, and means including a valve in said passage to receive and retain the air pumped by said plunger on its spring impelled stroke.

2. In an automatic tire pump, the combination of a body having a bore and a reciprocating plunger in the bore, a spring co-operating with the plunger to drive it on its pumping stroke, the body having a passage in communication with the bore, a spring-held check valve in said passage to receive and retain the air pumped on the spring-impelled stroke of the plunger, a diaphragm in communication with said passage, a trigger mounted on the body with one end in engagement with said diaphragm, adjustable means mounted on the plunger and under which the other end of the trigger may be moved by a predetermined pressure in said passage acting against the inner face of said diaphragm, and means co-acting with said trigger and said body to adjust said predetermined pressure, and means to move the plunger against the pressure of said springs.

3. In an automatic tire pump, the combination of a body having connection means provided with a passage and having a bore in communication with said passage, a reciprocating plunger in the bore, having a spring to drive the plunger on its pumping stroke, means to move the plunger against the pressure of said spring, a spring-held check valve in the passage, a diaphragm, one side of which is in communication with said passage, a trigger pivotally mounted on the body and having one end in engagement with the other side of said diaphragm, means adjustable along the plunger and under which the other end of said trigger may be moved by movement of the diaphragm resulting from a predetermined change of pressure in said passage, and adjusting means including a spring co-acting with said trigger and said body and providing adjustment of said predetermined change of pressure.

4. In an automatic tire pump, the combination of a body having a bore and a communicating passage having a check valve, a plunger mounted to reciprocate in the bore and operated on its pumping stroke by a spring to force air through said check valve into said passage, means to move the plunger on its outward stroke against the pressure of said spring, a diaphragm one side of which is in communication with said passage, a trigger pivotally mounted on the body and having one end in engagement with the other side of said diaphragm, means adjustable along the plunger and under which the other end of said trigger may be moved by a predetermined outward movement of said diaphragm, and means including a spring co-acting with the said trigger and said body and adapted to adjust the resistance by the trigger to the outward movement of said diaphragm.

5. In an automatic air pump having a body provided with a bore and a reciprocating plunger in the bore and operated by a spring on its inward pumping stroke to force air through a check valve into a passage, a lock adjustable along the plunger, means operated by the pressure of the air in the passage to engage said lock and prevent the inward movement of the plunger at a predetermined pressure in said passage, and means including a spring co-operating with said first means to adjust said predetermined pressure at which said engagement will take place.

In testimony whereof I affix my signature.

ANTON G. E. NORDQUIST.